United States Patent [19]
Ernst et al.

[11] 3,885,658
[45] May 27, 1975

[54] SYSTEM FOR MOUNTING CLUTCH RELEASE BEARINGS

[75] Inventors: Horst Ernst, Eltingshausen; Manfred Brandenstein, Aschfeld; Armin Olschewski, Schweinfurt, all of Germany

[73] Assignee: SKF Industrial Trading and Development Company, B.V., Amsterdam, Netherlands

[22] Filed: Oct. 11, 1973

[21] Appl. No.: 405,404

[30] Foreign Application Priority Data
Oct. 14, 1972 Germany.................................. 2250455

[52] U.S. Cl. ............................. 192/98; 192/110 B
[51] Int. Cl. ........................ F16d 19/00; F16d 11/06
[58] Field of Search............ 192/98, 110 B; 308/236

[56] References Cited
UNITED STATES PATENTS

| 1,958,725 | 5/1934 | Stein | 192/110 B X |
| 3,489,256 | 1/1970 | Binder et al. | 192/98 |
| 3,604,545 | 9/1971 | Bourgeois | 192/98 |
| 3,631,954 | 1/1972 | Coaley | 192/98 |
| 3,741,361 | 6/1973 | Brandenstein | 192/98 X |
| 3,749,217 | 7/1973 | Bush et al. | 192/98 X |

Primary Examiner—Samuel Scott
Assistant Examiner—Lance W. Chandler
Attorney, Agent, or Firm—Murray Schaffer

[57] ABSTRACT

Combination of a clutch release bearing and a clutch release lever mechanism. The axial frontal surface of the rotatable race member is curved. The clutch release mechanism has at least one lever, the end of which engages the curved frontal surface of the race member. The end of the lever is curved to conform to the race member, one of the radii of curvature being larger than the other exerting a radial force acting to center the bearing with respect to the lever mechanism.

6 Claims, 5 Drawing Figures

SYSTEM FOR MOUNTING CLUTCH RELEASE BEARINGS

RELATED CASES

The present invention relates to apparatus disclosed in German Pat. Application No. 1775412. Should the present disclosure require amplification or additional material, the same may be obtained from these cases, the disclosures of which are incorporated herein, as if more fully set forth.

BACKGROUND OF INVENTION

The present invention relates to the combination of a clutch release lever mechanism and the clutch bearing and in particular to a system for mating the rotatable race of the clutch release bearing and the release levers themselves.

In general, the clutch of a motor vehicle or the like includes a rotatable release lever mechanism interposed between the clutch and an actuating release bearing. The release levers are engageable by a rotatable race of the release bearing which is itself actuated by a central actuating sleeve or shaft. The release bearing is mounted about the actuating sleeve or shaft so as to have a degree of radial play. It is therefore necessary to center the bearing with respect to the release mechanism. It has been known to so center the bearing by providing the end of the actuating member with a tapered or spherical shape acting on the release lever mechanism itself.

It has also been known to design a clutch release mechanism having a plurality of levers in the form of separate tongues punched from a single plate-like spring member. The tongue-like levers press resiliently against the plane or frontal end surface of the revolving race of the clutch release bearing. The levers are of convex shape in relation to the plane end surface of the bearing in an attempt to obtain a uniform and symmetrical power transmission between the clutch bearing and the clutch itself via the clutch release mechanism.

It is an object of the present invention to provide an improved combination of clutch release bearing and clutch release lever mechanism in which a more accurate and more assured mating of the clutch levers with the end of the race of the clutch bearing is obtained.

It is a further object of the present invention to provide a combination of clutch release bearing mechanism and clutch release lever mechanism in which the clutch bearing is automatically centered with respect to the lever mechanism.

It is a further object of the present invention to provide a combination of a clutch release bearing and clutch release lever mechanism wherein the release levers are arranged in radially opposing pairs which are in both the centered and uncentered states in engagement with the race of the clutch release bearing to lie on a radial plane.

Further objects and numerous and advantages, together with the aforementioned objects, will be apparent from the following disclosure of the present invention.

SUMMARY OF THE INVENTION

According to the present invention, a combination of a clutch release bearing and a clutch release lever mechanism is provided wherein the bearing has a first race member, the axial frontal surface of which is curved. The clutch release lever mechanism has at least one lever the end of which is adapted to engage the frontal surface of the race and is curved conformingly thereto. One of the curves has a radius of curvature larger than the other so that a radial force is exerted between the clutch release bearing and the clutch release lever mechanism which force acts to center the bearing with respect to the lever mechanisms.

In general the form of the clutch release bearing is conventional in nature comprising in addition to the first race a second race and a plurality of roller means located therebetween. The bearing is mounted about a central sleeve or shaft and is radially movable with respect thereto with a small degree of freedom. The clutch release lever mechanism comprises an annular spring having a plurality of separate segments having ends engaging the curved surface of the first bearing race. The separate levers are matched in radially opposing pairs uniformly about the axis of the bearing.

In one embodiment of the present invention the frontal face of the first bearing race has a concave curvature and the end of the release levers have a convex curvature of smaller radius. In another embodiment of the present invention the frontal face of the bearing race has a convex curvature and the end of the release lever has a concave curvature of larger radius. The embodiments thus differ in kinematic reversal.

In general, through the design of the present invention the clutch release bearing is centered with respect to the clutch lever mechanism so that an improved power transmission, a longer bearing life and a more sufficient operation is obtained. The wear of the parts which come into contact is greatly reduced through the alignment of the clutch bearing, and the production of noise is significantly eliminated.

Full details of the present invention are set forth in the following description and are shown in the accompanying drawings.

DESCRIPTION OF INVENTION

Figure 1:
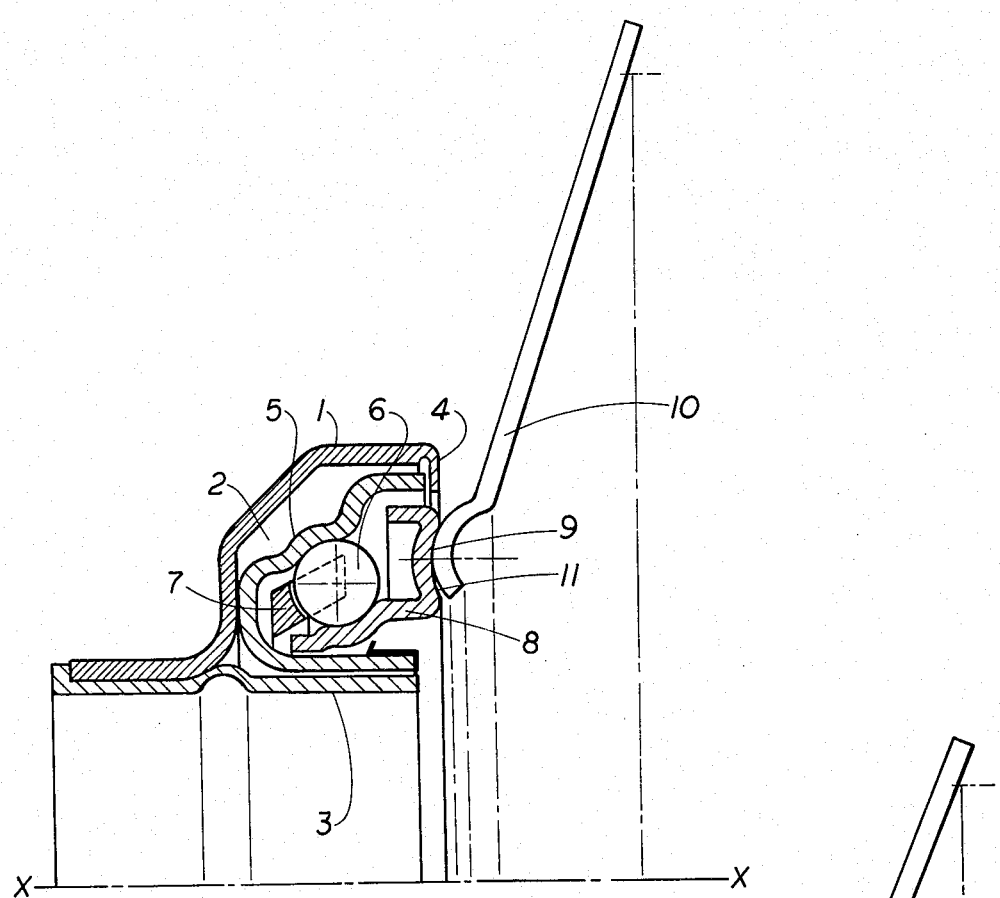
FIG. 1 shows one embodiment of a clutch release bearing and a clutch release lever mechanism formed in accordance with the present invention.

In the embodiment seen in FIG. 1 a clutch release assembly generally depicted by the numeral 1 is provided. The assembly is formed of sheet metal or the like and comprises an anti-friction ball or roller bearing 2 mounted about a central actuating sleeve 3. The bearing 2 is held at the end of the sleeve 3 in a metal cap 4 secured to the sleeve. The bearing 2 is mounted about the sleeve 3 and within the cap 4 so that it can shift in the axial direction and is freely shiftable slightly in a radial direction with respect to the central axis of the bearing depicted by the dot dash line X—X. The sleeve 3 is adapted to be actuated in conventional manner by the operator of the motor vehicle or the like.

Figure 3:
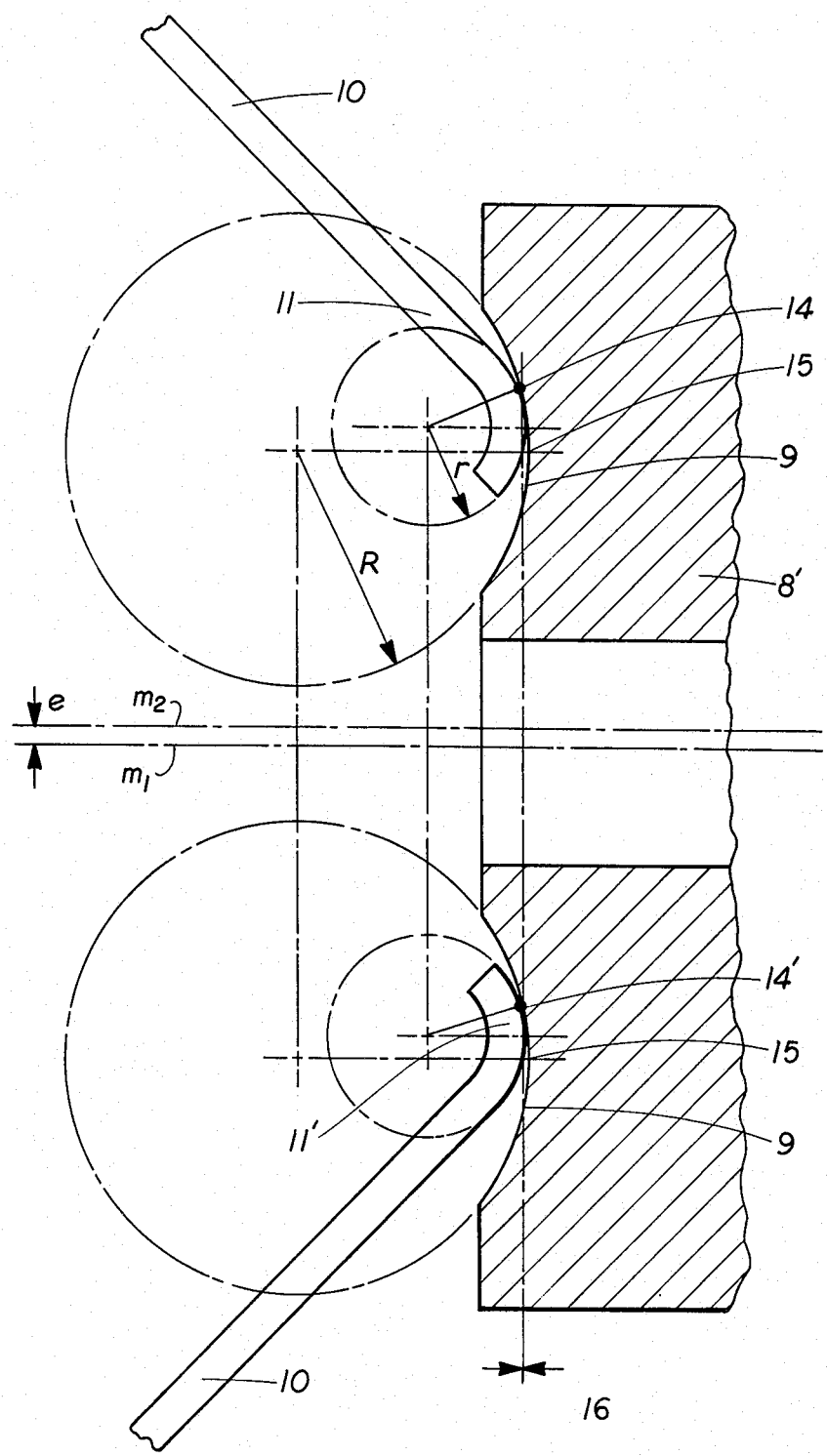
FIG. 3 is an enlarged sectional view of the mating area between the clutch release bearing and the clutch release lever mechanism.

The bearing 2 comprises an outer race ring 5, a plurality of roller or ball bodies 6, a cage 7, and an inner ring 8. The outer race ring 5 has a leg portion extending cylindrically about the sleeve 3 parallel to the central axis. The inner race ring 8 is adapted to fit freely within the outer race ring 5 and to be freely rotatable with respect to it. In this embodiment the frontal end of the inner race ring has a surface 9 which has a concave shape. Interposed between the clutch release bearing 1 and a not shown clutch release lever mechanism 10. The clutch release lever mechanism is a dish-shaped spring member such as a Belleville spring having a continuous outer rim from which a number of clutch levers in the form of spoke-like tongues are punched or otherwise cut, extending radially inwardly at an angle or curved arc inclined from the plane of the rim. Each of the clutch levers 10 has an end 11 which is convex in shape, to generally conform to the shape of the frontal end 9 of the bearing race 8. The end 11 is convex. The radius of curvature R, of the front end 9, (see FIG. 3) is greater than the radius of cruvature r of the end 11 of each of the levers. The levers of the clutch release mechanism 10 are identical and uniformly radiate from the rim about the periphery of the inner race ring 8 and, as will be seen with respect to FIG. 3, are preferably arranged in opposing pairs. The concave surface of the inner race ring 8 provides a seat or groove receiving the convex end 11 of the release levers 10 so that conjoint revolution of the two may be easily obtained without slippage. While sheet metal has been shown as the preferred form for the bearing, the release lever 10 maya be formed of plastic or synthetic material as well as sheet metal. The bearing members may be hollow or they may be solid members.

Figure 2:
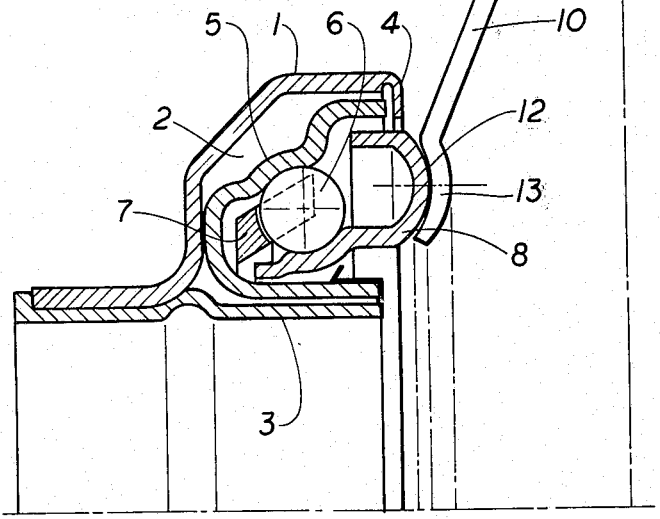
FIG. 2 is a second embodiment of the present invention.

The second embodiment shown in FIG. 2 differs from the first embodiment only in that the inner race ring is provided with a frontal end surface 12 which has a convex shape while the end 13 of the clutch release lever mechanism 10 is concave in shape. The radius of curvature of the convex frontal end 12 is in this embodiment less than the radius of curvature of the concave end 13 of the levers 10. Otherwise, the clutch release bearing generally depicted by the numeral 1 and the clutch release lever mechanism 10 is formed, arranged and functions in the manner described with respect to the embodiment of FIG. 1.

FIG. 3 shows the method in operation of centering the clutch bearing with respect to the clutch release lever mechanism of the embodiment shown in FIG. 1. It will be appreciated that the method of operation of the embodiment shown in FIG. 2 is identical except for the kinematic reversal of the convex and concave surfaces and therefore a more detailed explanation of FIG. 2 is unnecessary in view of the following description of FIG. 3. As seen in FIG. 3 the diametrically opposite clutch levers 10 and 10' are shown with their curved ends 11 and 11' mating with the corresponding frontal end 9 respectively of a race member 8'. The race member 8' is shown in FIG. 3 as being of solid and non sheet metal construction. It may be graphite, synthetic or plastic material or the like as previously mentioned. The race 8' has a central axis $M_1$ which is offset eccentrically by an amount e in relation to the plane of symmetry defined by the line $M_2$ of the levers 10 and 10'. The plane of symmetry $M_2$ is perpendicular to the levers 10 and 10' and perpendicular to the plane of the paper as seen in FIG. 3. This offset or eccentric condition is the condition of the race and the clutch lever mechanism in its unstressed or normal condition and the race 8' is centered by the clutch lever members 10 and 10' only in their stressed condition. The points of contact of the ends 11 and 11' of the levers 10 and 10' respectively are denoted by the numerals 14 and 14' respectively. These points of contact are not the points 15 and 15' which on the bases of the radius of curvature R of the surfaces 9. Because the points 14 and 14' are themselves offset from the bases 15 and 15' a force is exerted on the race 8' which causes the race 8' to move by the amount e so that it in turn becomes centered in relation to the clutch levers 10 and 10' under axial stress. As is clearly apparent from FIG. 3, the points 14 and 14' lie on a vertical plane 16 which is perpendicular to the plane of symmetry $M_2$. The vertical plane 16 also runs perpendicularly to the plane of the drawing. As a result of the axial stress placed on the clutch release bearing the release levers 10 and 10' exert what appears in the drawing to be a lifting force placing the central axis of the bearing in the plane of symmetry of the clutch release lever mechanism. Even in the uncentered condition and without axial stress on the arrangement, the geometric design of the mating surfaces 9 and 11 create a uniform and equal pressure on the race 8'. The oppositely paired tongues 10 and 10', (while only two are shown it will be appreciated that a plurality are uniformly spaced about the race 8') exert an equalizing force on the race 8' so when viewed from any angle about the axis of the bearing itself a same degree of pressure on the race 8' is obtained. Thus the coupling operation has no unequal stresses or strains between the release levers 10 and 10' and the race 8 which would lead to an otherwise distorted or increase in the eccentricity e. The race 8' always attempts to occupy a statically predetermined position in which, under operating conditions the ends 11 and 11' are urged into contact with the base 15 of the curved surface 9 of the race 8'. The base 15 may be defined as that point on which a vertical plane parallel to the plane 16 would be tangent to the curved surface 9 having the radius R. It is at this point that is base 15 that the end 11 of the release levers 10 transmit their force to the race 8'.

Figure 4A:
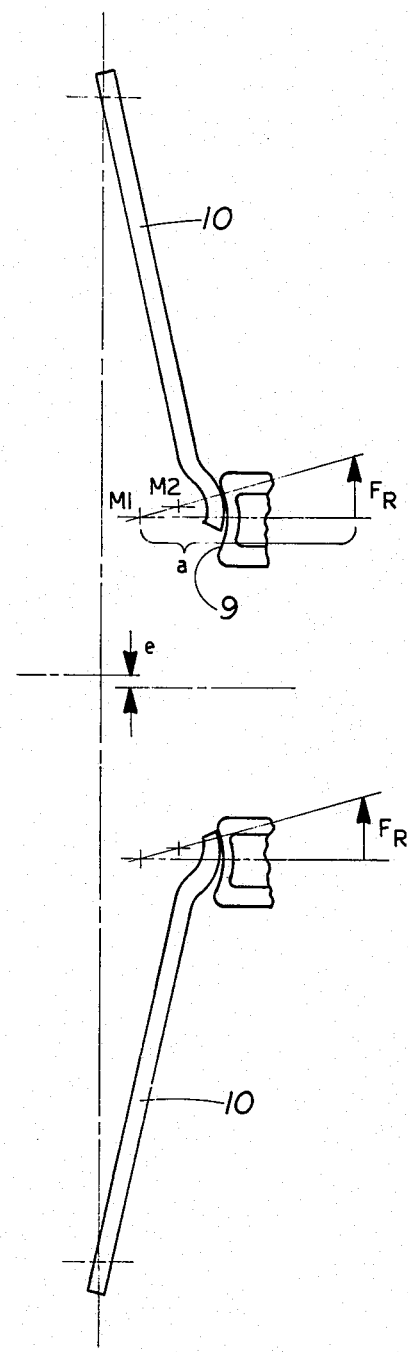
FIGS. 4a and 4b are schematic views of the structure shown in FIG. 3 showing the operation of the centering forces.
Figure 4B:
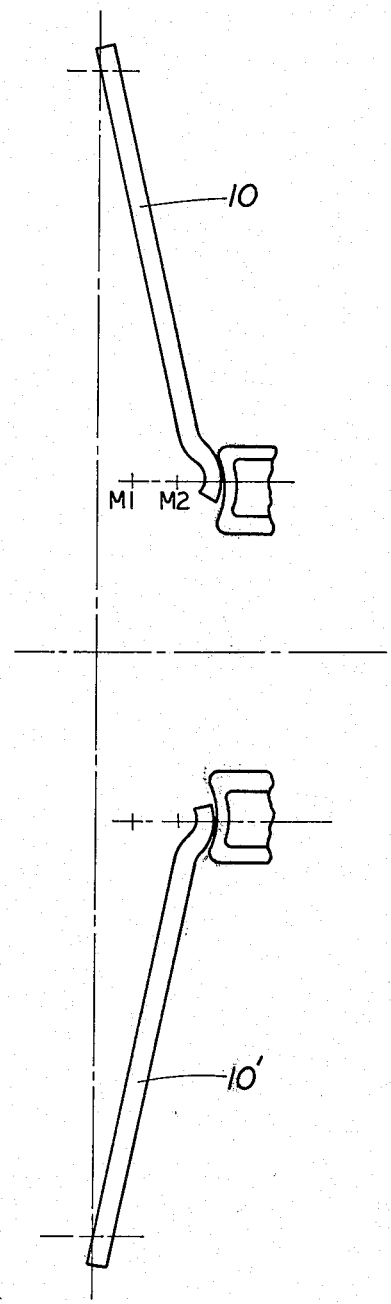

In the left half of FIG. 4 the mating of the clutch lever mechanism 10 with the frontal ends of the revolving race member 8 is shown during the initial coupling operation. The centers $M_1$ and $M_2$ of the race 8 and the end 11 respectively are initially offset by the radial spacing e. If these centers $M_1$ and $M_2$ were joined together by a straight line, they would form an angle with the horizontal over the freely selected axial spacing a having a component fr acting in a radial direction with the axis of the bearing. This radial component fr endeavors or acts to bring the bearing into its central position by exerting an upward force as seen in FIG. 4 so that the position shown in the righthand portion of FIG. 4 is obtained. In this portion of the figure the radial eccentric spacing e of the centers $M_1$ and $M_2$ is eliminated or brought to zero. As the centered position is reached the central points or axes $M_1$ and $M_2$ coincide and become coaxial. It will be apparent that while only two diametrically opposite clutch levers 10 and 10' are shown the effect is equal and cumulative for all of the levers.

The present disclosure shows various forms and embodiments, many other forms and changes in embodi-

What is claimed is:

1. The combination of a clutch release bearing and a clutch release lever mechanism, comprising an annular first race member, the axial frontal end of which has a curved surface, and a clutch release mechanism having at least one lever, the end of which engages said frontal surface of said first race member said end having a surface curved in cross section to conformingly mate with the frontal surface of said first race member, the radius of the curvature of one of said curved surface being larger than the other whereby a radial force is exerted to center the bearing with respect to the lever mechanism.

2. The combination according to claim 1 wherein said bearing includes a second race member and a plurality of rollers or balls located between said races, said bearing being mounted about a central sleeve and being radially movable with respect thereto, said release lever mechanism comprising an annular spring having a plurality of separate segments, the end of which engage the curved surfaces of said first bearing race member and are matched in radially opposing pairs.

3. The combination according to claim 1 wherein said frontal face of said bearing race member has a concave curvature and said end of said release lever has a convex curvature of smaller radius.

4. The combination according to claim 1 wherein said frontal face of said bearing race has a convex curvature and said end of said release lever has a concave curvature of larger radius.

5. The combination of claim 1 wherein said first race member is rotatable and said concave surface forms a groove for holding said race relative to said lever.

6. The combination according to claim 1 wherein said bearing and said release mechanism are freely mounted about central axes offset from each other by an amount equal to the amount necessary to move said bearing and release mechanism into centered position under the radial force component exerted.

* * * * *